US012676665B2

(12) United States Patent
Shrestha et al.

(10) Patent No.: US 12,676,665 B2
(45) Date of Patent: Jul. 7, 2026

(54) DATA TRANSMISSION USING STORE AND FORWARD SATELLITES

(71) Applicant: QUALCOMM Incorporated, San Diego, CA (US)

(72) Inventors: Bharat Shrestha, San Diego, CA (US); Umesh Phuyal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 357 days.

(21) Appl. No.: 18/359,748

(22) Filed: Jul. 26, 2023

(65) Prior Publication Data

US 2025/0038832 A1      Jan. 30, 2025

(51) Int. Cl.
*H04B 7/185* (2006.01)
*H04W 72/566* (2023.01)

(52) U.S. Cl.
CPC ...... *H04B 7/18513* (2013.01); *H04W 72/569* (2023.01)

(58) Field of Classification Search
CPC .......................... H04B 7/18513; H04W 72/569
See application file for complete search history.

(56) References Cited

U.S. PATENT DOCUMENTS

| | | | | |
|---|---|---|---|---|
| 5,666,648 | A * | 9/1997 | Stuart | H04B 7/195 |
| | | | | 455/13.1 |
| 2011/0044236 | A1* | 2/2011 | Giffin | H04L 1/18 |
| | | | | 370/316 |

| | | | | |
|---|---|---|---|---|
| 2017/0215176 | A1* | 7/2017 | Chan | H04B 7/2041 |
| 2019/0182829 | A1* | 6/2019 | Choi | H04W 72/0446 |
| 2021/0184989 | A1* | 6/2021 | Wu | H04L 47/762 |
| 2021/0242935 | A1* | 8/2021 | Sakhnini | H04B 7/18543 |
| 2023/0010606 | A1* | 1/2023 | Lever | H04B 7/195 |
| 2023/0209413 | A1* | 6/2023 | Jung | H04W 36/0005 |
| | | | | 370/316 |
| 2024/0063896 | A1* | 2/2024 | Catovic | H04B 7/18513 |
| 2024/0276213 | A1* | 8/2024 | Mavureddi Dhanasekaran | |
| | | | | H04W 12/06 |

OTHER PUBLICATIONS

3GPP TR 38.811: "3rd Generation Partnership Project, Technical Specification Group Radio Access Network, Study on New Radio (NR) to Support Non-Terrestrial Networks (Release 15)", 3GPP Standard, Technical Report, 3GPP TR 38.811, 3rd Generation Partnership Project, Mobile Competence Centre, 650, Route Des Lucioles, F-06921 Sophia-Antipolis Cedex, France, vol. TSG RAN, No. V15.3.0, Jul. 22, 2020, XP051925764, pp. 1-126, chapter 7.

(Continued)

*Primary Examiner* — Raymond S Dean
(74) *Attorney, Agent, or Firm* — Patterson & Sheridan, LLP

(57)      ABSTRACT

Certain aspects of the present disclosure provide techniques for data transmission in a store and forward non-terrestrial network (NTN). A method for wireless communication by a user equipment (UE), the method includes obtaining information of one or more NTN entities configured to store UE data. The method includes selecting one of the one or more NTN entities based on the information. The method includes outputting uplink data to the NTN entity.

29 Claims, 11 Drawing Sheets

(56) References Cited

OTHER PUBLICATIONS

Catt, et al., "Discussion and Proposal for Rel 19 Satellite", 3GPP
TSG SA2 Meeting #157, S2-2307044, 3rd Generation Partnership
Project, Mobile Competence Centre, 650, Route Des Lucioles,
F-06921 Sophia-Antipolis Cedex, France, vol. 3GPP SA 2, No.
Berlin, Germany, May 22-May 26, 2023, May 12, 2023, XP052393020,
11 pages, p. 1, left-hand column-p. 9, left-hand column.
International Search Report and Written Opinion—PCT/US2024/
036602—ISA/EPO—Oct. 29, 2024.

* cited by examiner

700

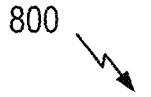
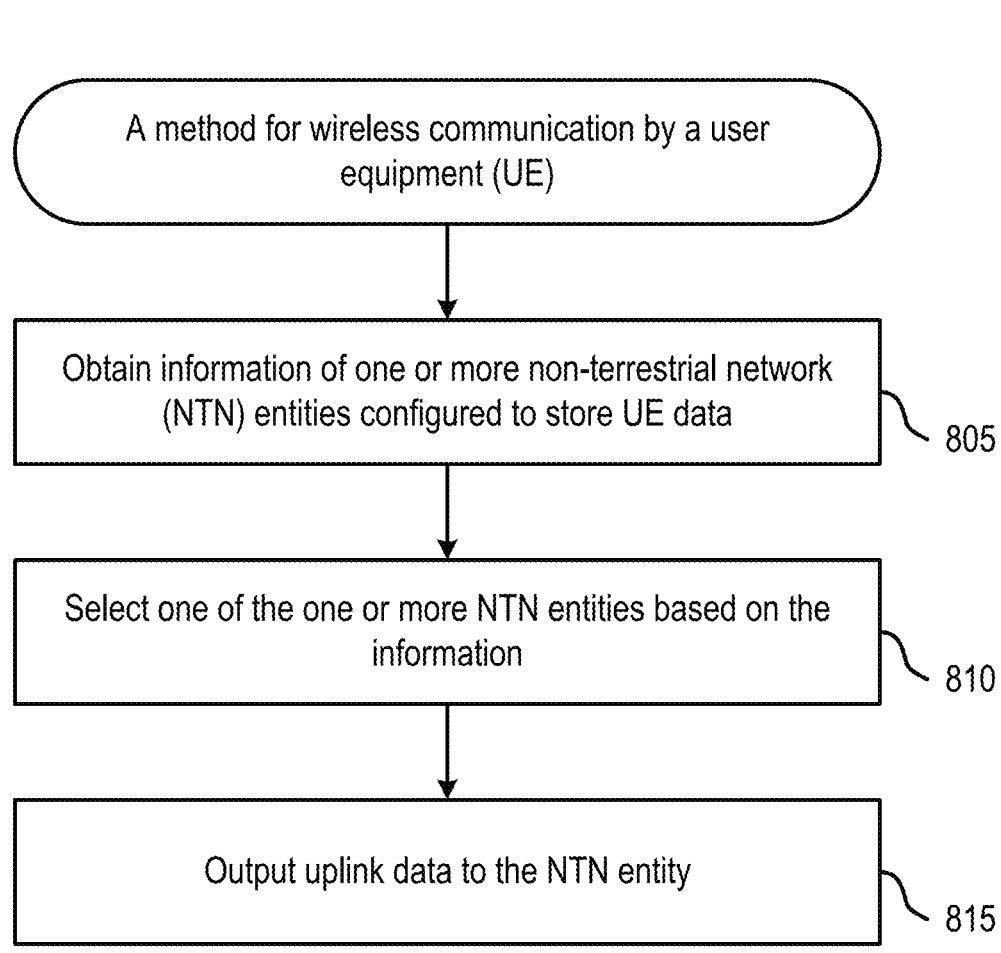
*FIG. 8*

900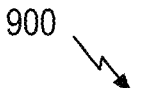

A method for wireless communication by a network entity

Output information to a user equipment (UE) of one or more non-terrestrial network (NTN) entities configured to store UE data, including the NTN entity, the information indicating one or more of: an amount of UE data the NTN entity is configured to store or a duration the NTN entity is configured to store the UE data

DATA TRANSMISSION USING STORE AND FORWARD SATELLITES

BACKGROUND

Field of the Disclosure

Aspects of the present disclosure relate to wireless communications, and more particularly, to techniques for data transmission using store and forward satellites.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving information of one or more non-terrestrial network (NTN) entities configured to store UE data. The method includes selecting one of the one or more NTN entities based on the information and transmitting uplink data to the NTN entity.

Another aspect provides a method for wireless communication by a NTN entity. The method includes outputting information to a UE of one or more NTN entities configured to store UE data, including the NTN entity, the information indicating one or more of: an amount of UE data the NTN entity is configured to store or a duration the NTN entity is configured to store the UE data.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein;

a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 8 depicts a method for wireless communications by a UE.

FIG. 9 depicts a method for wireless communications by an NTN entity.

DETAILED DESCRIPTION

Aspects of the present disclosure provide apparatuses, methods, processing systems, and computer-readable mediums for data transmission using store and forward satellites.

In store and forward operation, a UE can transmit uplink data to a satellite in the NTN while the UE is in coverage of the satellite. The satellite may store the uplink data until the satellite has connectivity with the ground station. When the satellite has connectivity with the ground station, the satellite forward the UE data to the ground station and the ground station may provide the UE data to an intended recipient. The ground station may provide a downlink response to the satellite and the satellite forwards the downlink response to the UE once the UE is in coverage of the satellite.

In NTN networks, UEs may have discontinuous coverage as satellites orbit the globe. In addition, coverage may be intermittent as the satellites lose connectivity with the ground station. In store and forward operation, the satellites may have a limited amount of storage. Thus, the satellite may have a storage quota and/or a storage time duration. The storage quota and/or time duration may be associated with a quality-of-service (QOS), a priority, or both.

Aspects of the present disclosure provide signaling information to the UE for the UE to use in satellite/cell selection and reselection. In some aspects, the information includes the storage quota and/or the data storage duration of a serving satellite and/or of neighboring satellites. Aspects of the present disclosure further provide techniques for the UE's logical channel priority based on the signaled information of the satellites. Aspects of the present disclosure further provide techniques for the UE satellite/cell selection or reselection based on the signaled information of the satellites.

The techniques provided herein enable store and forward operation in an NTN even in the case of discontinuous coverage and intermittent connectivity.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
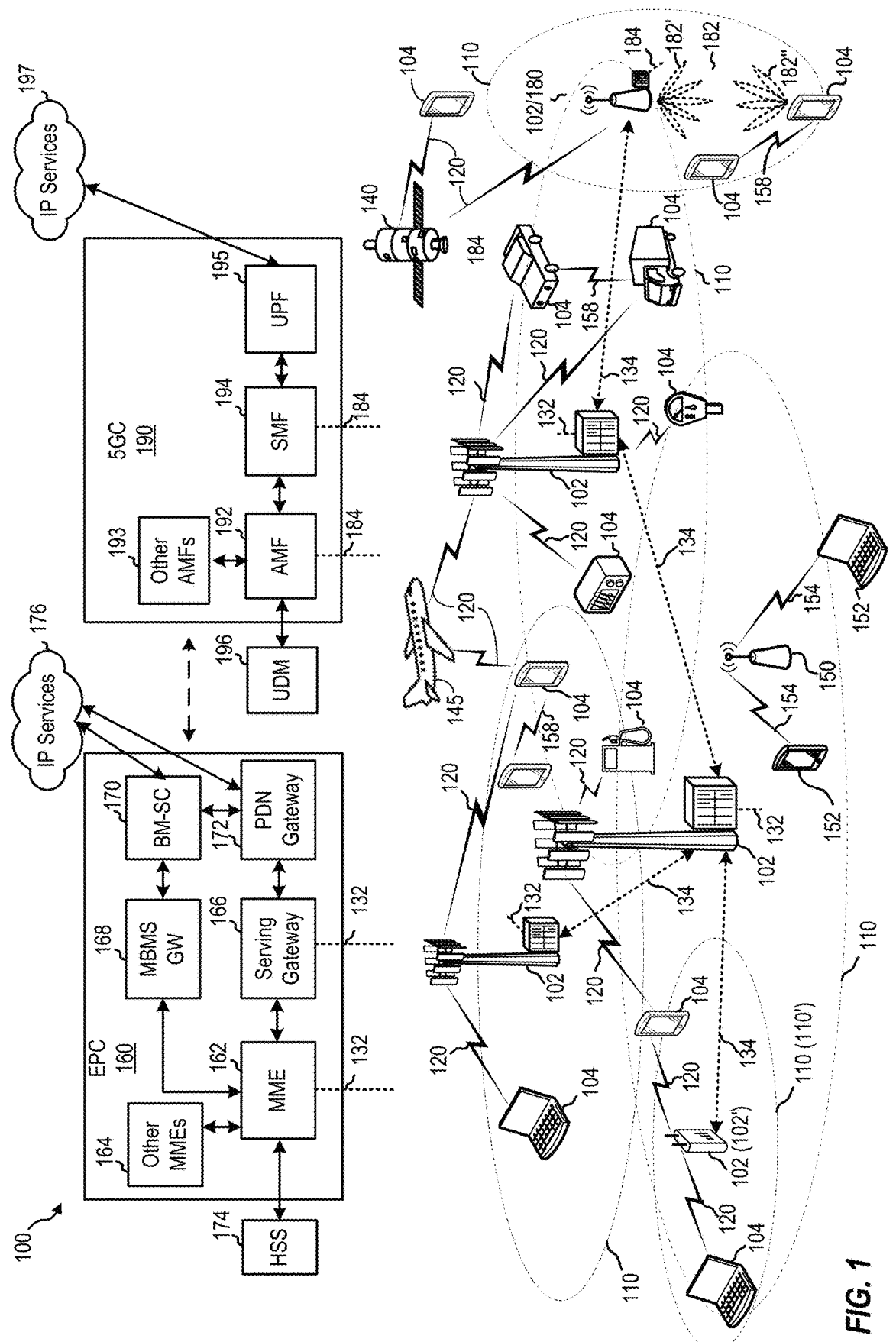
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
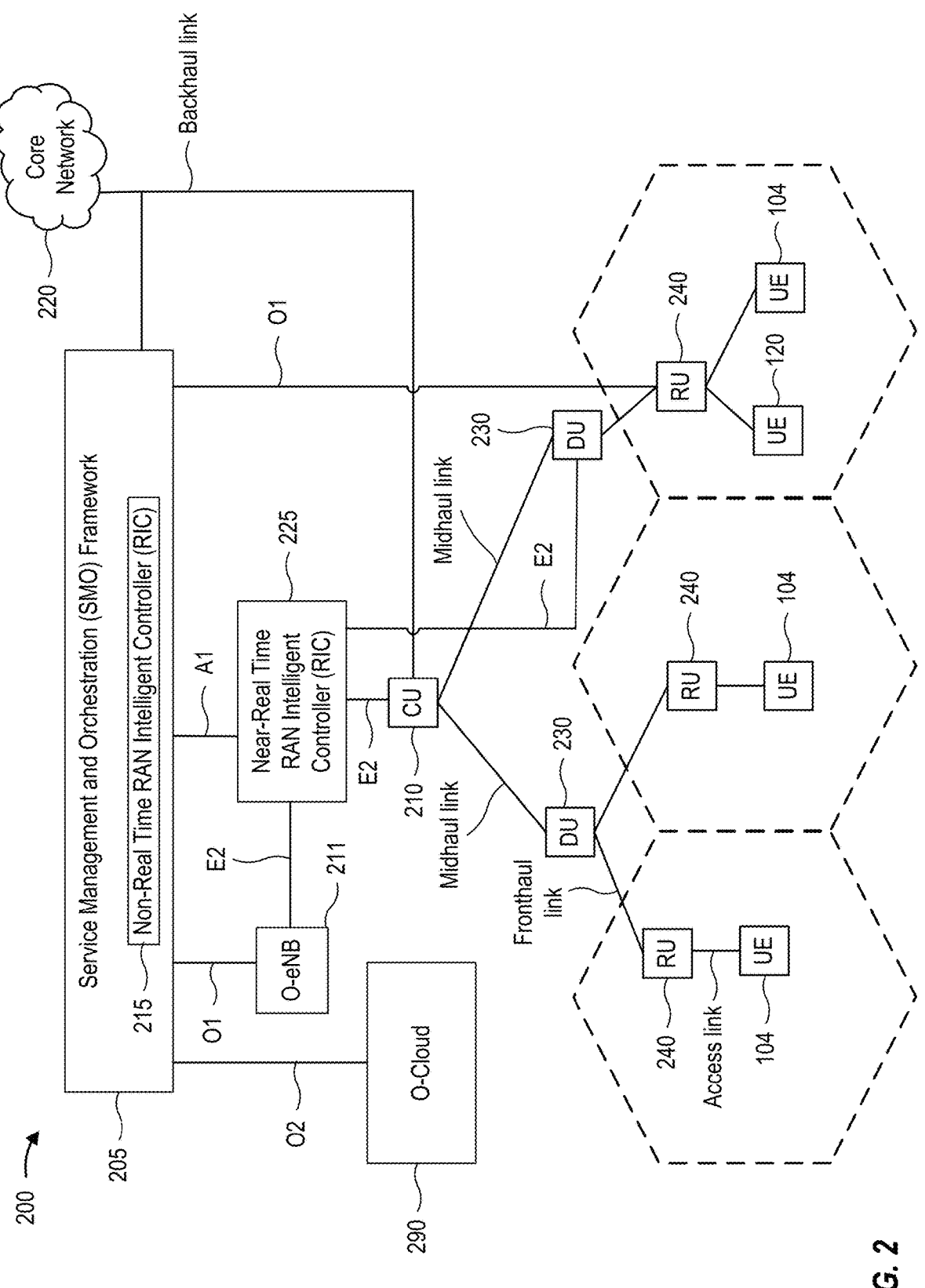
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHZ-71,000 MHZ, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52, 600 MHz and a second sub-range FR2-2 including 52,600 MHZ-71,000 MHz. A base station configured to communicate using mm Wave/near mm Wave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
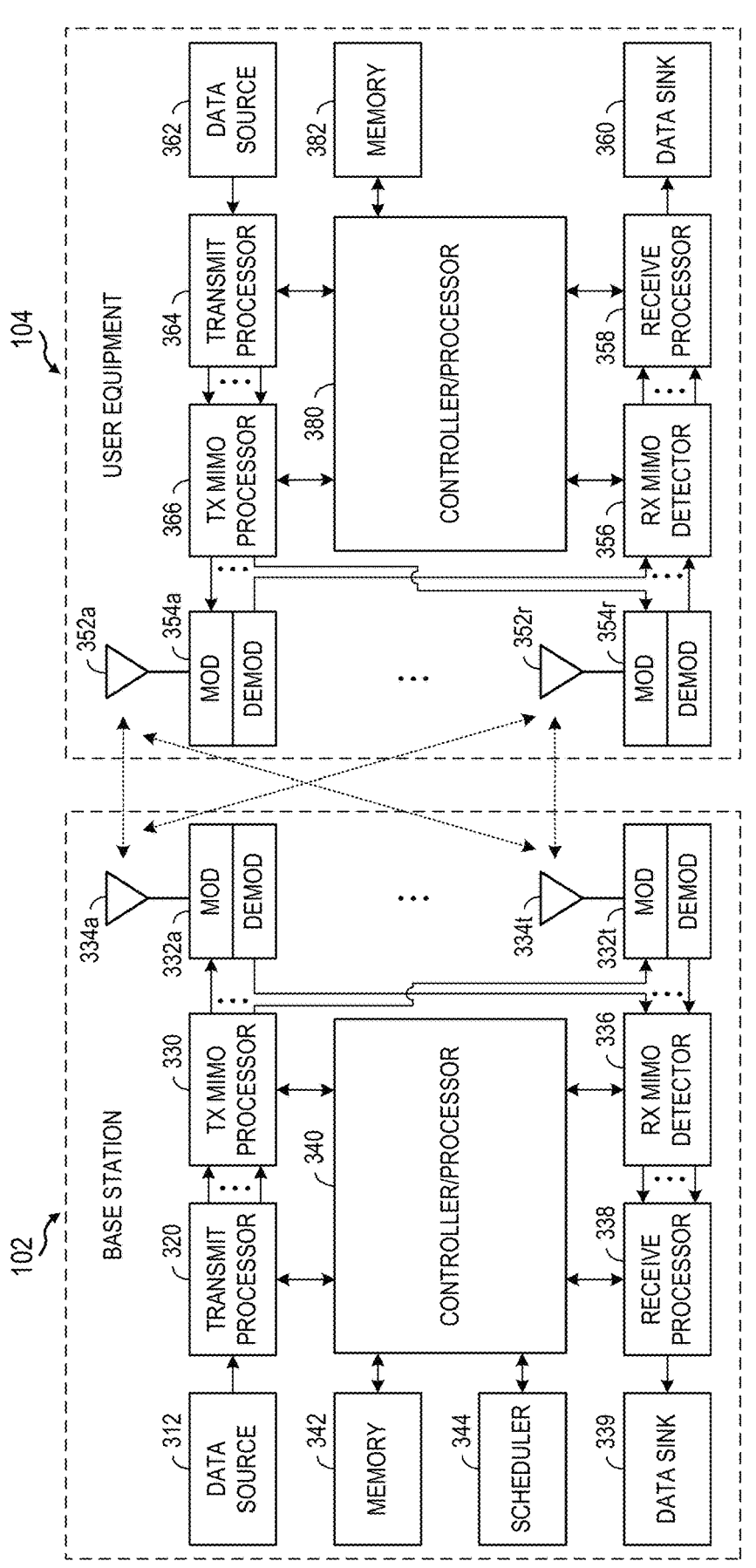
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, one or more memories 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, one or more memories 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, one or more memories 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, one or more memories 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
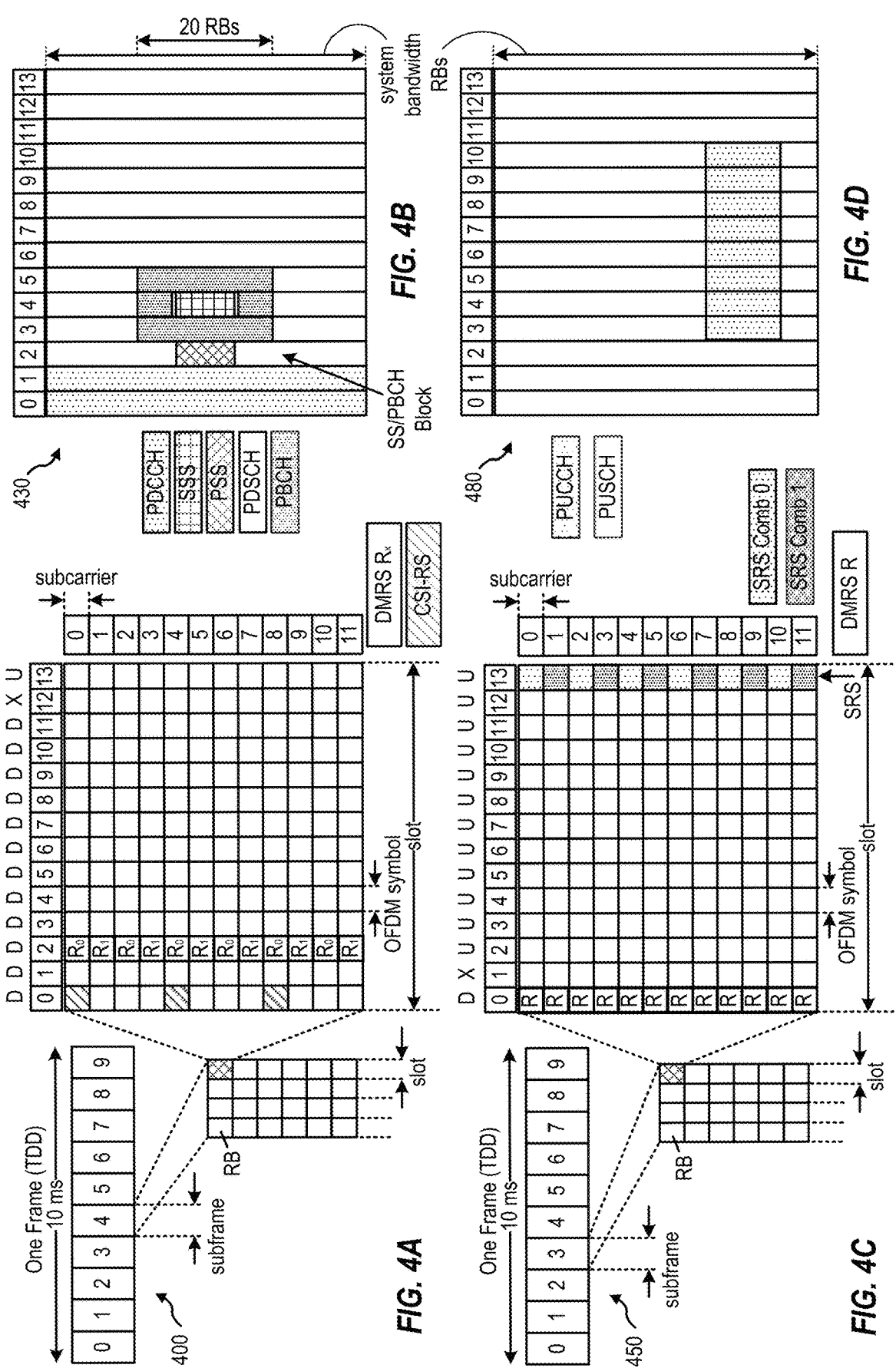
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot.

Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where u is the numerology 0 to 6. As such, the numerology u=0 has a subcarrier spacing of 15 kHz and the numerology μ=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology u=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Non-Terrestrial Networks

Satellite-based NTNs are crucial in providing connectivity with global coverage including rural and offshore areas, which are fundamental for supporting important use cases. A NTN generally refers to a network, or segment of networks, using RF resources on board a satellite. NTN signaling may be regenerative (with on-board NTN processing) or transparent (e.g., where the satellite sends back to Earth what it receives with only amplification and a shift from uplink to downlink frequency).

Figures 5A, 5B:
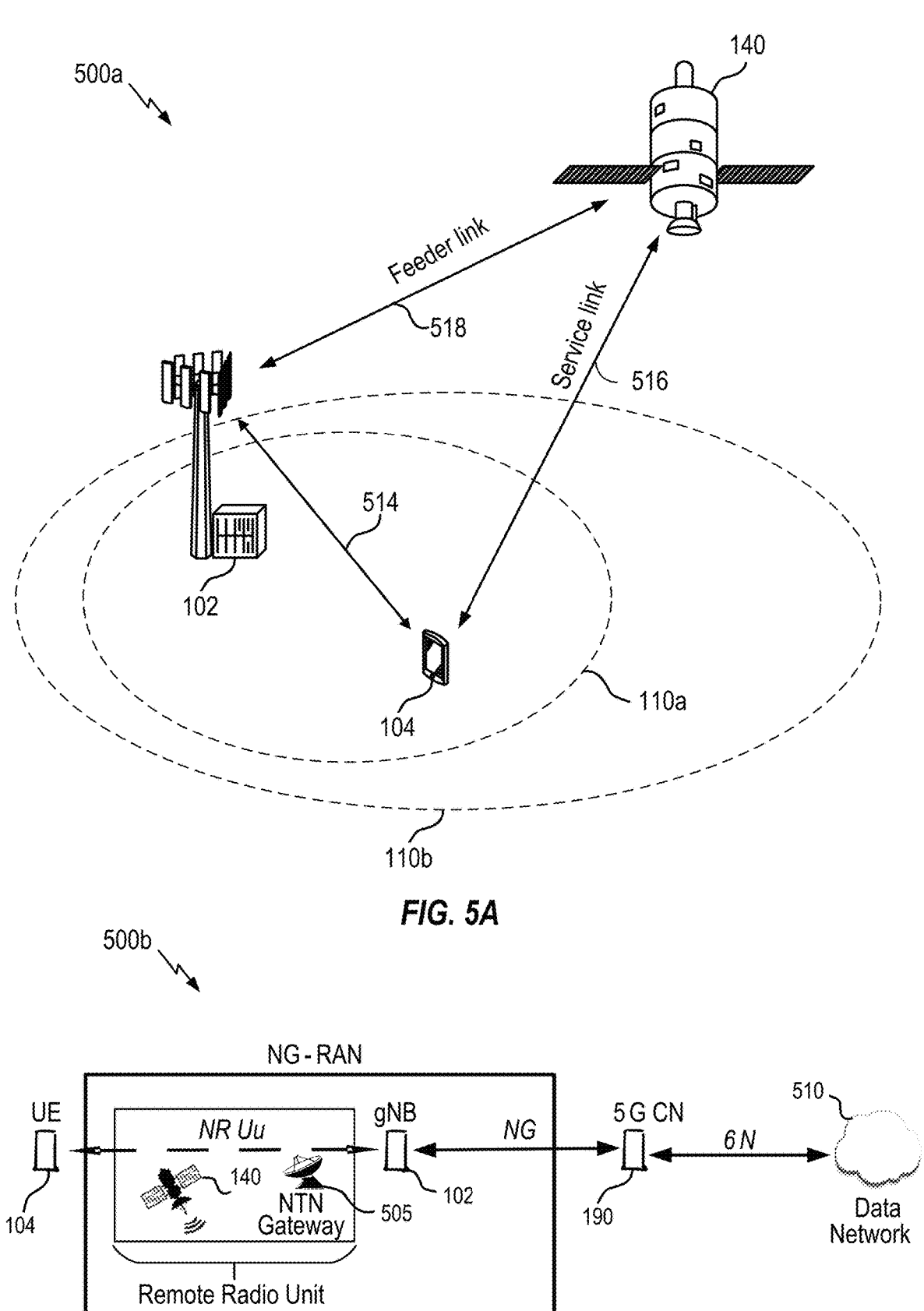
FIG. 5A depicts an example NTN.
FIG. 5B depicts example NTN architecture.

FIG. 5A illustrates an example of a wireless communications network 500a including a NTN entity 140. In some examples, the wireless communications network 500a may implement aspects of the wireless communication network 100. For example, the wireless communications network 500a may include a ground station such as BS 102, a UE 104, and an NTN entity such as the satellite 140. BS 102 may serve a coverage area or cell 110a in cases of a terrestrial network, and NTN entity 140 may serve the coverage area 110b in cases of a non-terrestrial network. Some NTNs may employ airborne platforms (e.g., a drone or balloon) and/or spaceborne platforms (e.g., a satellite).

The NTN entity 140 may communicate with the BS 102 and UE 104 as part of wireless communications in an NTN. In cases of a terrestrial network, the UE 104 may communicate with the BS 102 over a communication link 514 referred to as a feeder link. In the case of NTN wireless communications, the NTN entity 140 may be a serving cell for the UE 104 via a communication link 516 referred to as a service link. In certain aspects, the NTN entity 140 may act as a relay (or a remote radio head) for the BS 102 and the UE 104. For example, the BS 102 may communicate with the NTN entity 140 via a communication link 518, and the NTN entity 140 may relay signaling between the BS 102 and UE 104 via the communication links 516, 518. The NTN entity 140 may communicate with a terrestrial gateway (e.g., a satellite dish) via a feeder link. The BS 102 may be co-located with a gateway, deployed behind the gateway, and/or deployed on the satellite 140.

An NTN beam may cover an area of 100 km to 1000 km for a LEO satellite and 200 km to 3500 km for a Geostationary orbit (GEO) satellite. As illustrated in FIG. 5B, an NG-RAN 500b deployment may include satellite 140 and NTN gateway (GW) 505 serving as the cellular Uu) link between a UE 104 and a terrestrial network (TN) gNB 102 (and the 5G core network 190). NG-RAN 500b generally represents radio access network for 5G and provides both NR and LTE radio access. The link between the UE 104 and satellite 140 is generally referred to as the service link, while the link between the satellite and GW is generally referred to as the feeder link.

In some aspects, the satellite 140 communicates with different UEs as it moves across its orbit. As the satellite orbits, it communicates with different UEs through different beams. Uplink signals from the UEs experience a round trip delay (RTD) that is generally a sum of the delay on the service link plus the delay on the feeder link. The maximum RTD is typically around 541.46 ms for GEO satellites, 25.77 ms for LEO satellites at 600 km altitude, and 41.77 ms for LEO satellites at 1200 km altitude. UE speed can typically be ignored in comparison with speed of LEO satellite.

When a satellite 140 moves and the UE 104 is outside of the coverage area 110b of the satellite 140 is referred to as discontinuous coverage. Further, when a satellite 140 may not have a feeder link connectivity to a ground station is referred to as intermittent coverage.

Aspects Related to Data Transmission Using Store and Forward

Aspects of the disclosure related to data transmission using store and forward operation. Store and forward addresses discontinuous and intermittent coverage by enabling NTN entities (e.g., satellites) to collect uplink data from UEs in one geographic location, store the UE data, and later forward the UE data to a ground station (e.g., or a gateway or UE) in another geographic location.

Standardization efforts for NTN focus on transparent payload architectures where the satellite platform is necessarily connected to a ground station gateway to provide satellite access services to devices. These transparent payload architectures require complex ground segment infrastructure in low Earth orbit (LEO) constellation deployments to achieve global coverage. Satellite network deployments targeting the delivery of delay-tolerant applications, such as NB-IoT, are a major mMTC use case and benefit from architectures based on the use of regenerative payloads in the satellite and support for store and forward operation where satellite access can remain operational even at times when the satellite is not connected to a ground station. In particular, such an approach would allow for extending satellite service coverage in areas where satellites cannot be connected to ground stations (e.g., in maritime or very remote areas with lack of ground station infrastructure), improving ground segment affordability by enabling operation with fewer ground stations and allowing more robust operation of the satellite under intermittent feeder link operation.

Figures 6A, 6B:
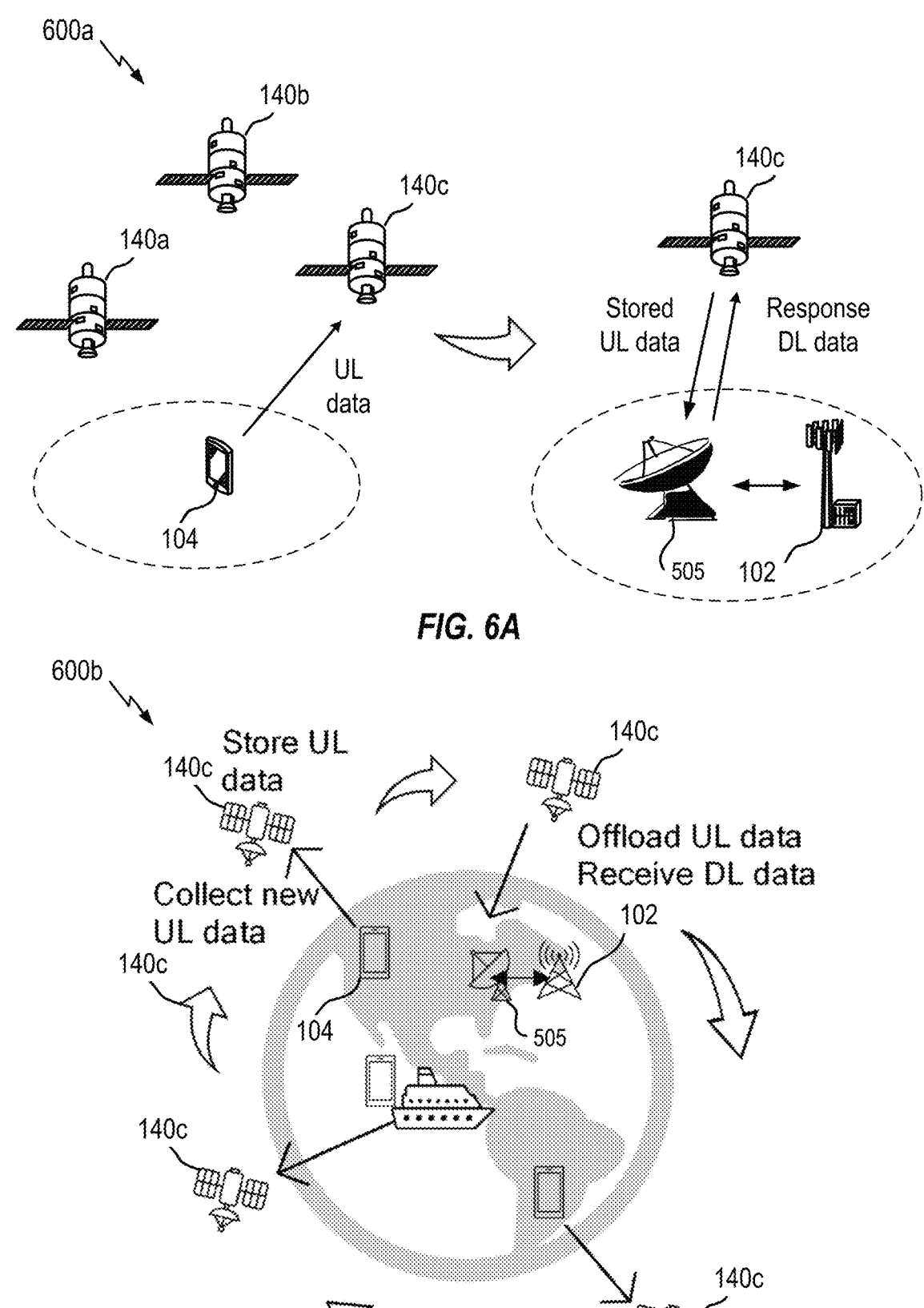
FIG. 6A depicts example store and forward deployment.
FIG. 6B depicts another example store and forward deployment.

FIG. 6A depicts example store and forward deployment 600a.

In store and forward operation in an NTN network, mobile originated (MO) traffic sent from a UE 104 may be achieved in two steps. In the first step, during service link availability, while the UE 104 is in a coverage area of one or more NTN entities (e.g., satellites 140a, 140b, and 140c), the UE 104 sends uplink data packets to the NTN, for example to the satellite 140c as shown. The satellite 140c stores the uplink data packets. In the second step, during feeder link availability, the satellite 140c is connected to the ground station, for example to the gateway 505 or base station 102 and the satellite 140c now forwards the data packets to the ground station. The ground station can then directly forward the packet to the destination recipient. The satellite 140c also receives response downlink data from the ground station to deliver back to the UE 104 the next time the satellite 140c and UE 104 have service link availability.

FIG. 6B depicts another example store and forward deployment 600b. As shown, while the satellite 140c orbits the globe, the satellite 140c collects uplink data from UEs 104, stores the uplink data, and offloads the uplink to the ground station (gateway 505 or base station 102) and receives the response downlink data.

Satellites may have limited storage capability. Accordingly, satellites may have a limited amount of UE data that can be stored and a limited duration that the satellites store the data. Aspects of the present disclosure provide information to the UEs amount the satellites that the UEs can use for selecting the cell/satellite. In some aspects, the storage amount and/or duration is associated with a priority or QoS target of the data and/or of the UEs. In some aspects, the storage amount or duration is associated with logical channels. Aspects of the present disclosure further provide techniques for the UE to perform satellite/cell selection and reselection and logical channel prioritization based on the information about the satellites. In some aspects, the UEs further receive cell barring information applicable to legacy UEs that do not support store and forward operation and cell barring information applicable to non-legacy UEs that support store and forward operation.

Example Operations of Entities in a Communications Network

Figure 7:
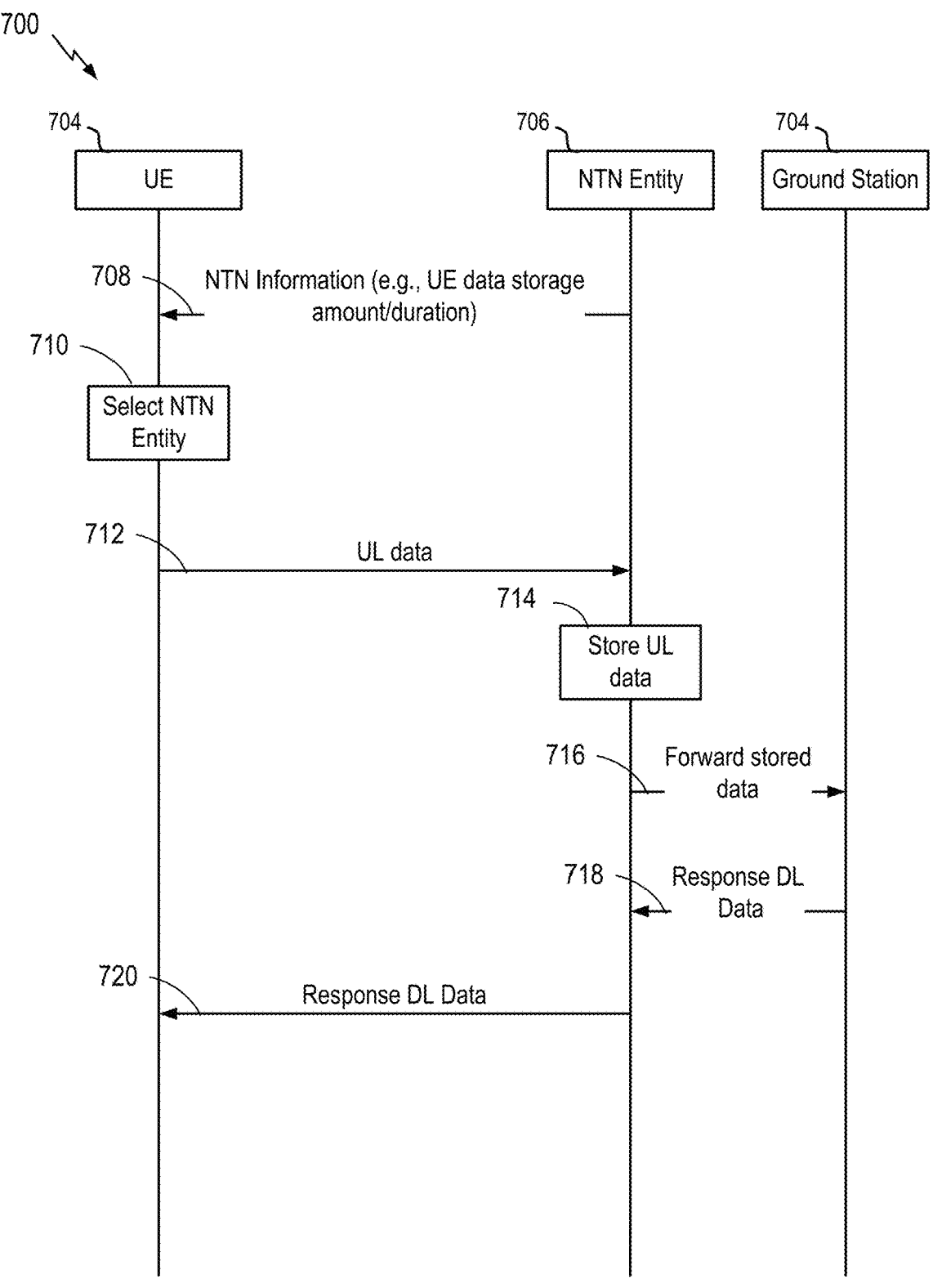
FIG. 7 depicts a process flow for communications in a network between a UE, an NTN entity, and a ground station.

FIG. 7 depicts a process flow 700 for communications in a network between, an NTN entity 706, a ground station 702, and a UE 704. In some aspects, the ground station 702 may be an example of the BS 102 depicted and described with respect to FIG. 1 and FIG. 3 or a disaggregated base station depicted and described with respect to FIG. 2. The NTN entity 706 may be an example of a satellite 140 depicted and described with respect to FIG. 1 and FIG. 6. Similarly, the UE 704 may be an example of UE 104 depicted and described with respect to FIG. 1 and FIG. 3. However, in other aspects, UE 104 may be another type of wireless communications device, BS 102 may be another type of network entity or network node, and NTN entity 706 may be another type of NTN entity, such as those described herein.

As shown, at operation 708, the UE 704 receive NTN information of one or more NTN entities. The NTN information may be received from the NTN entity 706 as shown. In some cases, the NTN information may be received from a ground station.

In some aspects, the NTN information is provided to the UE 704 via a broadcast message. For example, the NTN information may be broadcast to the UE 704 in a system information block (SIB), such as in a SIB1 or other SIB carrying serving satellite information.

In some aspects, the NTN information is information of the NTN entity 706. In some aspects, the NTN information is NTN information one or more neighboring NTN entities. In some aspects, the NTN information is provided to UE 704 via UE-specific signaling. For example, the NTN information may be provided to UE 704 via a dedicated RRC message or a dedicated non-access-stratum (NAS) message.

In some aspects, the NTN information may be UE-specific, satellite specific, cell specific, QoS specific, uplink and downlink data specific, and/or logical channel specific. Thus, different NTN information may be provided for different UEs, satellites, cells, QoS data, uplink and downlink, and/or logical channels.

In some aspects, the NTN information is a data storage quota of the NTN entity 706. The data storage quota is maximum amount of UE that the NTN entity 706 stores.

In some aspects, the NTN information is a storage duration quota of the NTN entity 706. The storage duration quota may be a maximum time duration that the NTN entity 706 stores UE data before discarding the data. For example, the storage duration quota may be the duration that the NTN entity 706 waits to receive response downlink data message for the UE data from the ground station before the NTN entity 706 discards the data. The storage duration quota may also correspond to a time duration that the UE 704 waits for the response downlink data before reattempting the UL data transmission. In some aspects, the storage duration quota is a time duration that the NTN entity 706 stores response downlink data before discarding the response downlink data (which may be the same or separate from the storage duration quota of the uplink UE data).

At operation 710, the UE 704 selects an NTN entity to access and send uplink data to. In some aspects, the selection is based on the NTN information received at operation 708.

In some aspects, the UE 704 checks the data storage quota information of the NTN entity before initiating random access. If the uplink data of the UE 704 is not larger than the storage quota of the NTN entity 706, the UE 704 initiates random access with the NTN entity 706. If the uplink data of the UE 704 is larger than the storage quota of the NTN entity 706, the UE 704 may leave the cell and try to find another suitable cell. In some aspects, the UE 704 may use the cell only for a registration update procedure and request a large data storage quota for the NTN entity 706. In some aspects, the UE 704 may inform its upper layers about the data storage quota of the NTN entity 706 to limit the uplink data to meet the data storage quota. Where the NTN entity 706 increases its data storage quota as request or the UE 704 limits the uplink data, the UE 704 can proceed with initiating random access.

In some aspects, the UE 704 checks the data storage duration information of the NTN entity before initiating random access. If the uplink data of the UE 704 is not delay sensitive and the data storage duration of the NTN entity 706 is sufficient, the UE 704 initiates random access with the NTN entity 706. If the uplink data of the UE 704 is delay sensitive and the data storage duration of the NTN entity 706 is insufficient, the UE 704 may leave the cell and try to find another suitable cell. In some aspects, the UE 704 may use the cell only for a registration update procedure and request a large data storage duration for the NTN entity 706.

In some aspects, logical channel prioritization is based on the NTN information. In some aspects, each logical channel is configured with a store and forward data storage quota and/or data storage duration. In some aspects, each logical channel is configured with whether or not the logical channel is subject to a store and forward data storage quota and/or data storage duration. When an uplink grant is received, the UE 704 may select a logical channel configured with store and forward data storage quota and/or data storage duration that meets the data storage quota and/or data storage duration of the NTN entity 706.

In some aspects, the UE 704 receives assistance information of neighboring satellites. The assistance information may include a frequency of the neighboring satellites, a cell ID of the neighboring satellites, a data storage quota of the neighboring satellites, a data storage duration of the neighboring satellites, a next feeder link availability of the neighboring satellites, and/or a next revisit time to a store and forward service area of the neighboring satellites (e.g., based on a fixed reference location on the Earth's surface).

In some aspects, the UE 704 uses the assistance information of the neighboring cells to perform cell reselection. For example, the UE 704 may reselect to an NTN entity with a shortest feeder link availability time, a largest data storage duration, a largest data storage quota, etc.

In some aspects, the UE 704 receives barring information. In some aspects, the barring information is received together with the NTN information. In some aspects, the barring information is received separately from the NTN information.

The barring information may indicated satellites or cells that the UE 704 is barred from accessing. In some aspects, the barring information includes legacy barring information that may be read by both legacy UEs that do not support store and forward operation and by non-legacy UEs that support store and forward operation. The legacy UEs may following the legacy barring information. In some aspects, the barring information further includes store and forward barring information (e.g., a new additional barring bit). The UEs that support store and forward operation further check the store and forward barring information and follow the store and forward barring information. The legacy do not check, or do not follow the store and forward barring information. The UEs that support store and forward operation may override the legacy barring information with the store and forwarding barring information. The UEs may follow the barring information when performing satellite/cell selection reselection.

At operation 712, the UE 704 transmit the uplink data to the selected NTN entity 706 (e.g., after performing initial access with the NTN entity).

At operation 714, the NTN entity 706 stores the UE data ((e.g., if an amount of the uplink data does not exceed a data storage quota of the NTN entity 706).

At operation 718, the ground station 702 transmits response downlink data to the NTN entity 706 (e.g., if a duration has not exceeded a data storage quota of the NTN entity 706).

At operation 720, the response downlink data is forward to the UE 704.

In some aspects, the UE 704 further determines an NTN entity to monitor the downlink response data from. While FIG. 7 illustrates the UE 704 receives the downlink response data from the NTN entity 706, in some aspects, the UE 704 may receive the downlink response data from a different NTN entity than the NTN entity 706 to which the UE 704 uploaded the uplink data.

In some aspects, the UE 704 sends an indication to the NTN entity 706 of whether the UE 704 will track the same NTN entity 706 and monitor the downlink response data from the NTN entity 706 or will track and monitor a different NTN entity for the response downlink data. In some aspects, the UE 704 may indicate that the UE 704 will monitor and receive the response downlink data from any NTN entity that can deliver the response downlink data the earliest. In response, the UE 704 may be configured with the next visit satellite visit time or a wake up time to monitor the response downlink data. In some aspects, the network determines the satellite visit or wake up time for the UE 704 based on a QoS of the data, a priority of the UE, a logical channel associated with the data, the response data storage quota of the satellites, and/or the response storage duration quota of the satellites.

In some aspects, the network decides whether the UE 704 will track and monitor the same NTN entity or a different NTN for the response downlink data, and indicates to the UE 704. In some aspects, the network decides based on the UE's subscription, the UE's priority, and/or a network capability such as whether multiple satellites and/or ground stations are available.

Example Operations by a User Equipment

FIG. 8 shows an example of a method 800 of wireless communication by a user equipment (UE), such as a UE 104 of FIGS. 1 and 3.

Method 800 begins at step 805 with obtaining information of one or more NTN entities configured to store UE data. In some cases, the operations of this step refer to, or may be performed by, circuitry for obtaining and/or code for obtaining as described with reference to FIG. 10.

In some aspects, the information for each of the one or more NTN entities comprises one or more of: an amount of UE data the NTN entity is configured to store or a duration the NTN entity is configured to store the UE data.

In some aspects, the one or more of: the amount of UE data the NTN entity is configured to store or the duration the NTN entity is configured to store the UE data is associated with a QoS of the UE data or of a logical channel.

In some aspects, the one or more of: the amount of UE data the NTN entity is configured to store or the duration the NTN entity is configured to store the UE data is associated with at least one of: a priority of the UE data or a priority of the UE.

In some aspects, the one or more of: the amount of UE data the NTN entity is configured to store or the duration the NTN entity is configured to store the UE data is UE specific.

In some aspects, the one or more of: the amount of UE data the NTN entity is configured to store or the duration the NTN entity is configured to store the UE data is NTN entity specific.

In some aspects, the one or more of: the amount of UE data the NTN entity is configured to store or the duration the NTN entity is configured to store the UE data is cell specific.

In some aspects, the one or more of: the amount of UE data the NTN entity is configured to store or the duration the NTN entity is configured to store the UE data comprises a first amount of downlink UE data the NTN entity is configured to store or the duration the NTN entity is configured to store the downlink UE data and a second amount of uplink UE data the NTN entity is configured to store or the duration the NTN entity is configured to store the uplink UE data.

In some aspects, the obtaining the information of the one or more NTN entities comprises obtaining a broadcast system information block (SIB) indicating the one or more of: the amount of UE data the NTN entity is configured to store or the duration the NTN entity is configured to store the UE data.

In some aspects, the obtaining the information of the one or more NTN entities comprises obtaining dedicated signaling indicating the one or more of: the amount of UE data the NTN entity is configured to store or the duration the NTN entity is configured to store the UE data.

In some aspects, the obtaining the information of the one or more NTN entities comprises obtaining the amount of UE data the NTN entity is configured to store.

Method 800 then proceeds to step 810 with selecting one of the one or more NTN entities based on the information. In some cases, the operations of this step refer to, or may be performed by, circuitry for selecting and/or code for selecting as described with reference to FIG. 10.

In some aspects, the method 800 further includes determining, before initiating random access with an NTN entity of the one or more NTN entities, whether an amount of uplink data at the UE is larger than the amount of UE data the NTN entity is configured to store. In some cases, the operations of this step refer to, or may be performed by, circuitry for determining and/or code for determining as described with reference to FIG. 10.

In some aspects, the method 800 further includes selecting a different NTN entity when the amount of uplink data at the UE is larger than the amount of UE data the NTN entity is configured to store. In some cases, the operations of this step refer to, or may be performed by, circuitry for selecting and/or code for selecting as described with reference to FIG. 10.

In some aspects, the method 800 further includes requesting a larger amount of uplink data the NTN entity when the amount of uplink data at the UE is larger than the amount of UE data the NTN entity is configured to store. In some cases, the operations of this step refer to, or may be performed by, circuitry for requesting and/or code for requesting as described with reference to FIG. 10.

In some aspects, the method 800 further includes restricting an amount of the uplink data sent to the NTN entity when the amount of uplink data at the UE is larger than the amount of UE data the NTN entity is configured to store. In some cases, the operations of this step refer to, or may be performed by, circuitry for restricting and/or code for restricting as described with reference to FIG. 10.

In some aspects, the method 800 further includes initiating random access with the NTN entity when the amount of uplink data at the UE is equal to or smaller than the amount of UE data the NTN entity is configured to store. In some cases, the operations of this step refer to, or may be performed by, circuitry for initiating and/or code for initiating as described with reference to FIG. 10.

Method 800 then proceeds to step 815 with outputting uplink data to the NTN entity. In some cases, the operations of this step refer to, or may be performed by, circuitry for outputting and/or code for outputting as described with reference to FIG. 10.

In some aspects, the obtaining the information of the one or more NTN entities comprises obtaining the duration the NTN entity is configured to store the UE data.

In some aspects, the method 800 further includes outputting uplink data to an NTN entity of the one or more NTN entities. In some cases, the operations of this step refer to, or may be performed by, circuitry for outputting and/or code for outputting as described with reference to FIG. 10.

In some aspects, the method 800 further includes monitoring a response to the uplink data for the duration the NTN entity is configured to store the UE data. In some cases, the operations of this step refer to, or may be performed by, circuitry for monitoring and/or code for monitoring as described with reference to FIG. 10.

In some aspects, the method 800 further includes retransmitting the uplink data when the response is not received during the duration the NTN entity is configured to store the UE data. In some cases, the operations of this step refer to, or may be performed by, circuitry for retransmitting and/or code for retransmitting as described with reference to FIG. 10.

In some aspects, the method 800 further includes selecting an NTN entity to initiate random access with based on the duration the NTN entity is configured to store the UE data. In some cases, the operations of this step refer to, or may be performed by, circuitry for selecting and/or code for selecting as described with reference to FIG. 10.

In some aspects, the selecting the NTN entity to initiate random access with comprises selecting an NTN entity with a shorter data storage duration when the UE had uplink data with a delay target.

In some aspects, selecting the NTN entity to initiate random access with comprises selecting an NTN entity with a longer data storage duration when the UE has delay sensitive uplink data.

In some aspects, the one or more of: the amount of UE data the NTN entity is configured to store or the duration the NTN entity is configured to store the UE data is logical channel specific.

In some aspects, the method 800 further includes obtaining an indication for each of a plurality of logical channels whether the one or more of: the amount of UE data the NTN entity is configured to store or the duration the NTN entity is configured to store the UE data applies to the logical channel. In some cases, the operations of this step refer to, or may be performed by, circuitry for obtaining and/or code for obtaining as described with reference to FIG. 10.

In some aspects, the method 800 further includes selecting a logical channel of a plurality of logical channels for outputting uplink data to an NTN entity of the one or more NTN entities based on whether the logical channel satisfies the amount of UE data the NTN entity is configured to store or the duration the NTN entity is configured to store the UE data. In some cases, the operations of this step refer to, or may be performed by, circuitry for selecting and/or code for selecting as described with reference to FIG. 10.

In some aspects, the method 800 further includes outputting an indication for each of a plurality of logical channels whether the one or more of: the amount of UE data the NTN entity is configured to store or the duration the NTN entity is configured to store the UE data applies to the logical channel. In some cases, the operations of this step refer to, or may be performed by, circuitry for outputting and/or code for outputting as described with reference to FIG. 10.

In some aspects, the method 800 further includes obtaining assistance information from a serving NTN entity indicating information of one or more neighboring NTN entities, wherein the information includes a frequency, a cell identifier (ID), an amount of UE data the NTN entity is configured to store, a duration the NTN entity is configured to store the UE data, a next feeder link availability time, a time of a next visit to store and forward service area, of the one or more neighboring NTN entities, or a combination thereof. In some cases, the operations of this step refer to, or may be performed by, circuitry for obtaining and/or code for obtaining as described with reference to FIG. 10.

In some aspects, the method 800 further includes reselecting one of the one or more neighboring NTN entities based on the information. In some cases, the operations of this step refer to, or may be performed by, circuitry for reselecting and/or code for reselecting as described with reference to FIG. 10.

In some aspects, the method 800 further includes outputting uplink data to one of the one or more NTN entities. In some cases, the operations of this step refer to, or may be performed by, circuitry for outputting and/or code for outputting as described with reference to FIG. 10.

In some aspects, the method 800 further includes outputting an indication of whether the UE expects a response to the uplink data from the NTN entity or another NTN entity. In some cases, the operations of this step refer to, or may be performed by, circuitry for outputting and/or code for outputting as described with reference to FIG. 10.

In some aspects, the method 800 further includes obtaining an indication of a time to monitor the response to the uplink data. In some cases, the operations of this step refer to, or may be performed by, circuitry for obtaining and/or code for obtaining as described with reference to FIG. 10.

In some aspects, the method 800 further includes obtaining an indication of an NTN entity to monitor a response to the uplink data. In some cases, the operations of this step refer to, or may be performed by, circuitry for obtaining and/or code for obtaining as described with reference to FIG. 10.

In some aspects, the method 800 further includes obtaining a first cell barring indication indicating the one or more NTN entities are barred. In some cases, the operations of this step refer to, or may be performed by, circuitry for obtaining and/or code for obtaining as described with reference to FIG. 10.

In some aspects, the method 800 further includes obtaining a second cell barring indication indicating whether one or more of the one or more NTN entities are barred. In some cases, the operations of this step refer to, or may be performed by, circuitry for obtaining and/or code for obtaining as described with reference to FIG. 10.

In some aspects, the method 800 further includes following only the first cell barring indication when the UE does not support store and forward operation and following only the second cell barring indication when the UE supports store and forward operation. In some cases, the operations of this step refer to, or may be performed by, circuitry for following and/or code for following as described with reference to FIG. 10. In some aspects, the one or more NTN entities comprises satellites.

Figure 10:
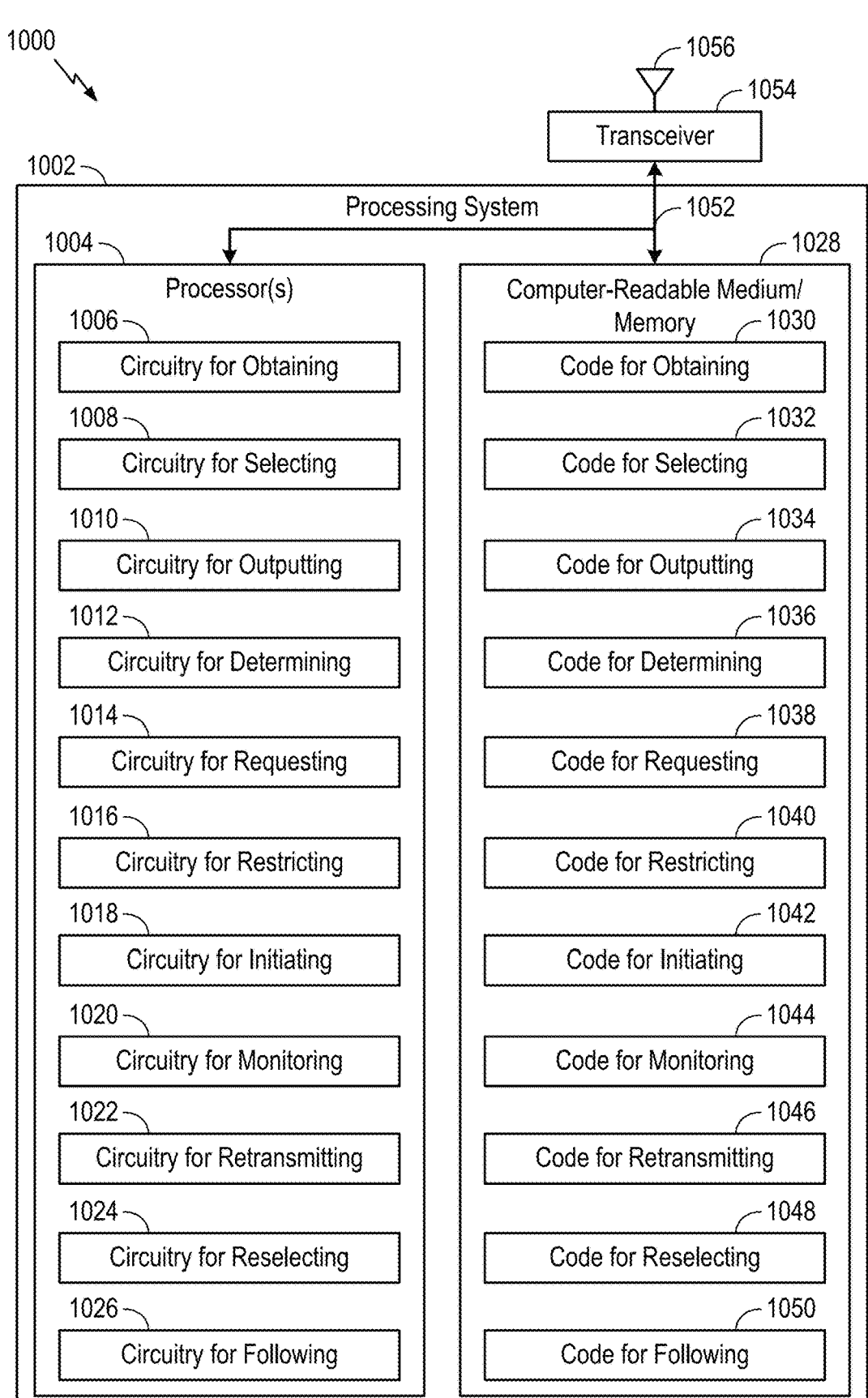
FIG. 10 depicts aspects of an example communications device.

In one aspect, method 800, or any aspect related to it, may be performed by an apparatus, such as communications device 1000 of FIG. 10, which includes various components operable, configured, or adapted to perform the method 800. Communications device 1000 is described below in further detail.

Note that FIG. 8 is just one example of a method, and other methods including fewer, additional, or alternative steps are possible consistent with this disclosure.

Example Operations by a Network Entity

FIG. 9 shows an example of a method 900 of wireless communication by a network entity, such as an NTN entity (e.g., a satellite 140). In some aspects, operations of method 900 may be performed by a ground station (e.g., a BS 102 of FIGS. 1 and 3, or a disaggregated base station as discussed with respect to FIG. 2).

Method 900 begins at step 905 with outputting information to a user equipment (UE) of one or more non-terrestrial network (NTN) entities configured to store UE data, including the NTN entity, the information indicating one or more of: an amount of UE data the NTN entity is configured to store or a duration the NTN entity is configured to store the UE data. In some cases, the operations of this step refer to, or may be performed by, circuitry for outputting and/or code for outputting as described with reference to FIG. 11.

In some aspects, the one or more of: the amount of UE data the NTN entity is configured to store or the duration the NTN entity is configured to store the UE data is associated with a quality-of-service (QOS) of the UE data or of a logical channel.

In some aspects, the one or more of: the amount of UE data the NTN entity is configured to store or the duration the NTN entity is configured to store the UE data is associated with at least one of: a priority of the UE data or a priority of the UE.

In some aspects, the one or more of: the amount of UE data the NTN entity is configured to store or the duration the NTN entity is configured to store the UE data is UE specific.

In some aspects, the one or more of: the amount of UE data the NTN entity is configured to store or the duration the NTN entity is configured to store the UE data is NTN entity specific.

In some aspects, the one or more of: the amount of UE data the NTN entity is configured to store or the duration the NTN entity is configured to store the UE data is cell specific.

In some aspects, the one or more of: the amount of UE data the NTN entity is configured to store or the duration the NTN entity is configured to store the UE data comprises a first amount of downlink UE data the NTN entity is configured to store or the duration the NTN entity is configured to store the downlink UE data and a second amount of uplink UE data the NTN entity is configured to store or the duration the NTN entity is configured to store the uplink UE data.

In some aspects, the outputting the information of the one or more NTN entities comprises outputting a broadcast system information block (SIB) indicating the one or more of: the amount of UE data the NTN entity is configured to store or the duration the NTN entity is configured to store the UE data.

In some aspects, the outputting the information of the one or more NTN entities comprises outputting dedicated signaling indicating the one or more of: the amount of UE data the NTN entity is configured to store or the duration the NTN entity is configured to store the UE data.

In some aspects, the outputting the information of the one or more NTN entities comprises outputting the amount of UE data the NTN entity is configured to store.

In some aspects, the method 900 further includes obtaining a request for a larger amount of UE data at least one NTN entity of the one or more NTN entities is configured to store. In some cases, the operations of this step refer to, or may be performed by, circuitry for obtaining and/or code for obtaining as described with reference to FIG. 11.

In some aspects, the method 900 further includes configuring the NTN entity to store the larger amount of UE data in response to the request. In some cases, the operations of this step refer to, or may be performed by, circuitry for configuring and/or code for configuring as described with reference to FIG. 11.

In some aspects, the outputting the information of the one or more NTN entities comprises outputting the duration the NTN entity is configured to store the UE data.

In some aspects, the one or more of: the amount of UE data the NTN entity is configured to store or the duration the NTN entity is configured to store the UE data is logical channel specific.

In some aspects, the method 900 further includes outputting assistance information from a serving NTN entity indicating information of one or more neighboring NTN entities, wherein the information includes a frequency, a cell identifier (ID), an amount of UE data the NTN entity is configured to store, a duration the NTN entity is configured to store the UE data, a next feeder link availability time, a time of a next visit to store and forward service area, of the one or more neighboring NTN entities, or a combination thereof. In some cases, the operations of this step refer to, or may be performed by, circuitry for outputting and/or code for outputting as described with reference to FIG. 11.

In some aspects, the method 900 further includes obtaining an indication of an NTN the UE expects a response to uplink data from. In some cases, the operations of this step refer to, or may be performed by, circuitry for obtaining and/or code for obtaining as described with reference to FIG. 11.

In some aspects, the method 900 further includes outputting an indication of a time for the UE to monitor a response to uplink data. In some cases, the operations of this step refer to, or may be performed by, circuitry for outputting and/or code for outputting as described with reference to FIG. 11.

In some aspects, the method 900 further includes outputting an indication of an NTN entity for the UE to monitor a response to uplink data. In some cases, the operations of this step refer to, or may be performed by, circuitry for outputting and/or code for outputting as described with reference to FIG. 11.

In some aspects, the method 900 further includes outputting a first cell barring indication indicating the one or more NTN entities are barred for UEs that do not support store and forward operation. In some cases, the operations of this step refer to, or may be performed by, circuitry for outputting and/or code for outputting as described with reference to FIG. 11.

In some aspects, the method 900 further includes outputting a second cell barring indication indicating whether one or more of the one or more NTN entities are barred for UEs that support store and forward operation. In some cases, the operations of this step refer to, or may be performed by, circuitry for outputting and/or code for outputting as described with reference to FIG. 11.

In some aspects, the one or more NTN entities comprises satellites.

In some aspects, the method 900 further includes receiving uplink data from the UE intended another UE. In some cases, the operations of this step refer to, or may be performed by, circuitry for receiving and/or code for receiving as described with reference to FIG. 11.

In some aspects, the method 900 further includes providing the uplink data to a ground station associated with the other UE. In some cases, the operations of this step refer to, or may be performed by, circuitry for providing and/or code for providing as described with reference to FIG. 11.

In some aspects, the network entity is a satellite.

Figure 11:
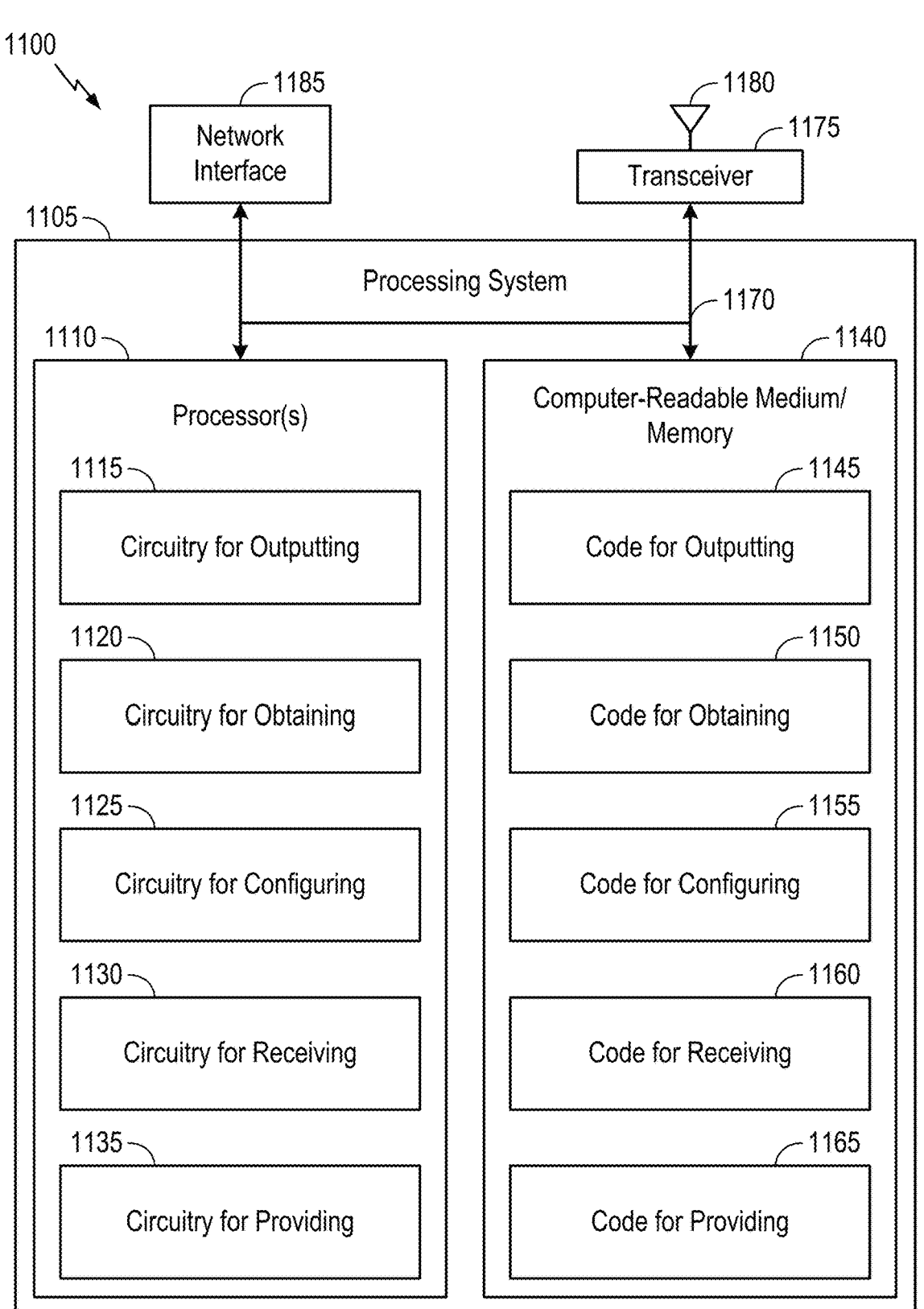
FIG. 11 depicts aspects of an example communications device.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Example Communications Device(s)

FIG. 10 depicts aspects of an example communications device 1000. In some aspects, communications device 1000 is a user equipment, such as UE 104 described above with respect to FIGS. 1 and 3.

The communications device 1000 includes a processing system 1002 coupled to the transceiver 1054 (e.g., a transmitter and/or a receiver). The transceiver 1054 is configured to transmit and receive signals for the communications device 1000 via the antenna 1056, such as the various signals as described herein. The processing system 1002 may be configured to perform processing functions for the communications device 1000, including processing signals received and/or to be transmitted by the communications device 1000.

The processing system 1002 includes one or more processors 1004. In various aspects, the one or more processors 1004 may be representative of one or more of receive processor 358, transmit processor 364, TX MIMO processor 366, and/or controller/processor 380, as described with respect to FIG. 3. The one or more processors 1004 are coupled to a computer-readable medium/memory 1028 via a bus 1052. In certain aspects, the computer-readable medium/memory 1028 is configured to store instructions (e.g., computer-executable code) that when executed by the one or more processors 1004, cause the one or more processors 1004 to perform the method 800 described with respect to FIG. 8, or any aspect related to it. Note that reference to a processor performing a function of communications device 1000 may include one or more processors 1004 performing that function of communications device 1000.

In the depicted example, computer-readable medium/memory 1028 stores code (e.g., executable instructions), such as code for obtaining 1030, code for selecting 1032, code for outputting 1034, code for determining 1036, code for requesting 1038, code for restricting 1040, code for initiating 1042, code for monitoring 1044, code for retransmitting 1046, code for reselecting 1048, and code for following 1050. Processing of the code for obtaining 1030, code for selecting 1032, code for outputting 1034, code for determining 1036, code for requesting 1038, code for restricting 1040, code for initiating 1042, code for monitoring 1044, code for retransmitting 1046, code for reselecting 1048, and code for following 1050 may cause the communications device 1000 to perform the method 800 described with respect to FIG. 8, or any aspect related to it.

The one or more processors 1004 include circuitry configured to implement (e.g., execute) the code stored in the computer-readable medium/memory 1028, including circuitry such as circuitry for obtaining 1006, circuitry for selecting 1008, circuitry for outputting 1010, circuitry for determining 1012, circuitry for requesting 1014, circuitry for restricting 1016, circuitry for initiating 1018, circuitry for monitoring 1020, circuitry for retransmitting 1022, circuitry for reselecting 1024, and circuitry for following 1026. Processing with circuitry for obtaining 1006, circuitry for selecting 1008, circuitry for outputting 1010, circuitry for determining 1012, circuitry for requesting 1014, circuitry for restricting 1016, circuitry for initiating 1018, circuitry for monitoring 1020, circuitry for retransmitting 1022, circuitry for reselecting 1024, and circuitry for following 1026 may cause the communications device 1000 to perform the method 800 described with respect to FIG. 8, or any aspect related to it.

Various components of the communications device 1000 may provide means for performing the method 800 described with respect to FIG. 8, or any aspect related to it. For example, means for transmitting, sending or outputting for transmission may include transceivers 354 and/or antenna(s) 352 of the UE 104 illustrated in FIG. 3 and/or the transceiver 1054 and the antenna 1056 of the communications device 1000 in FIG. 10. Means for receiving or obtaining may include transceivers 354 and/or antenna(s) 352 of the UE 104 illustrated in FIG. 3 and/or the transceiver 1054 and the antenna 1056 of the communications device 1000 in FIG. 10.

FIG. 11 depicts aspects of an example communications device 1100. In some aspects, communications device 1100 is a network entity, such as BS 102 of FIGS. 1 and 3, or a disaggregated base station as discussed with respect to FIG. 2.

The communications device 1100 includes a processing system 1105 coupled to the transceiver 1175 (e.g., a transmitter and/or a receiver) and/or a network interface 1185. The transceiver 1175 is configured to transmit and receive signals for the communications device 1100 via the antenna 1180, such as the various signals as described herein. The network interface 1185 is configured to obtain and send signals for the communications device 1100 via communication link(s), such as a backhaul link, midhaul link, and/or fronthaul link as described herein, such as with respect to FIG. 2. The processing system 1105 may be configured to perform processing functions for the communications device 1100, including processing signals received and/or to be transmitted by the communications device 1100.

The processing system 1105 includes one or more processors 1110. In various aspects, one or more processors 1110 may be representative of one or more of receive processor 338, transmit processor 320, TX MIMO processor 330, and/or controller/processor 340, as described with respect to FIG. 3. The one or more processors 1110 are coupled to a computer-readable medium/memory 1140 via a bus 1170. In certain aspects, the computer-readable medium/memory 1140 is configured to store instructions (e.g., computer-executable code) that when executed by the one or more processors 1110, cause the one or more processors 1110 to perform the method 900 described with respect to FIG. 9, or any aspect related to it. Note that reference to a processor of communications device 1100 performing a function may include one or more processors 1110 of communications device 1100 performing that function.

In the depicted example, the computer-readable medium/memory 1140 stores code (e.g., executable instructions), such as code for outputting 1145, code for obtaining 1150, code for configuring 1155, code for receiving 1160, and code for providing 1165. Processing of the code for outputting 1145, code for obtaining 1150, code for configuring 1155, code for receiving 1160, and code for providing 1165 may cause the communications device 1100 to perform the method 900 described with respect to FIG. 9, or any aspect related to it.

The one or more processors 1110 include circuitry configured to implement (e.g., execute) the code stored in the computer-readable medium/memory 1140, including circuitry such as circuitry for outputting 1115, circuitry for obtaining 1120, circuitry for configuring 1125, circuitry for receiving 1130, and circuitry for providing 1135. Processing with circuitry for outputting 1115, circuitry for obtaining 1120, circuitry for configuring 1125, circuitry for receiving 1130, and circuitry for providing 1135 may cause the communications device 1100 to perform the method 900 described with respect to FIG. 9, or any aspect related to it.

Various components of the communications device 1100 may provide means for performing the method 900 described with respect to FIG. 9, or any aspect related to it. Means for transmitting, sending or outputting for transmission may include transceivers 332 and/or antenna(s) 334 of the BS 102 illustrated in FIG. 3 and/or the transceiver 1175 and the antenna 1180 of the communications device 1100 in FIG. 11. Means for receiving or obtaining may include transceivers 332 and/or antenna(s) 334 of the BS 102 illustrated in FIG. 3 and/or the transceiver 1175 and the antenna 1180 of the communications device 1100 in FIG. 11.

Example Aspects

Implementation examples are described in the following numbered clauses:

Clause 1: A method for wireless communication by a user equipment (UE), comprising: obtaining information of one or more non-terrestrial network (NTN) entities configured to store UE data; selecting one of the one or more NTN entities based on the information; and outputting uplink data to the NTN entity.

Clause 2: The method of Clause 1, wherein the information for each of the one or more NTN entities comprises one or more of: an amount of UE data the NTN entity is configured to store or a duration the NTN entity is configured to store the UE data.

Clause 3: The method of Clause 2, wherein the one or more of: the amount of UE data the NTN entity is configured to store or the duration the NTN entity is configured to store the UE data is associated with a quality-of-service (QOS) of the UE data or of a logical channel.

Clause 4: The method of any combination of Clauses 2-3, wherein the one or more of: the amount of UE data the NTN entity is configured to store or the duration the NTN entity is configured to store the UE data is associated with at least one of: a priority of the UE data or a priority of the UE.

Clause 5: The method of any combination of Clauses 2-4, wherein the one or more of: the amount of UE data the NTN entity is configured to store or the duration the NTN entity is configured to store the UE data is UE specific.

Clause 6: The method of any combination of Clauses 2-5, wherein the one or more of: the amount of UE data the NTN entity is configured to store or the duration the NTN entity is configured to store the UE data is NTN entity specific.

Clause 7: The method of any combination of Clauses 2-6, wherein the one or more of: the amount of UE data the NTN entity is configured to store or the duration the NTN entity is configured to store the UE data is cell specific.

Clause 8: The method of any combination of Clauses 2-7, wherein the one or more of: the amount of UE data the NTN entity is configured to store or the duration the NTN entity is configured to store the UE data comprises a first amount of downlink UE data the NTN entity is configured to store or the duration the NTN entity is configured to store the downlink UE data and a second amount of uplink UE data the NTN entity is configured to store or the duration the NTN entity is configured to store the uplink UE data.

Clause 9: The method of any combination of Clauses 2-8, wherein the obtaining the information of the one or more NTN entities comprises obtaining a broadcast system information block (SIB) indicating the one or more of: the amount of UE data the NTN entity is configured to store or the duration the NTN entity is configured to store the UE data.

Clause 10: The method of any combination of Clauses 2-9, wherein the obtaining the information of the one or more NTN entities comprises obtaining dedicated signaling indicating the one or more of: the amount of UE data the NTN entity is configured to store or the duration the NTN entity is configured to store the UE data.

Clause 11: The method of any combination of Clauses 2-10, wherein the obtaining the information of the one or more NTN entities comprises obtaining the amount of UE data the NTN entity is configured to store.

Clause 12: The method of Clause 11, further comprising determining, before initiating random access with an NTN entity of the one or more NTN entities, whether an amount of uplink data at the UE is larger than the amount of UE data the NTN entity is configured to store.

Clause 13: The method of Clause 12, further comprising selecting a different NTN entity when the amount of uplink data at the UE is larger than the amount of UE data the NTN entity is configured to store.

Clause 14: The method of any combination of Clauses 12-13, further comprising requesting a larger amount of uplink data the NTN entity when the amount of uplink data at the UE is larger than the amount of UE data the NTN entity is configured to store.

Clause 15: The method of any combination of Clauses 12-14, further comprising restricting an amount of the uplink data sent to the NTN entity when the amount of uplink data at the UE is larger than the amount of UE data the NTN entity is configured to store.

Clause 16: The method of any combination of Clauses 12-15, further comprising initiating random access with the NTN entity when the amount of uplink data at the UE is equal to or smaller than the amount of UE data the NTN entity is configured to store.

Clause 17: The method of any combination of Clauses 2-16, wherein the obtaining the information of the one or more NTN entities comprises obtaining the duration the NTN entity is configured to store the UE data.

Clause 18: The method of Clause 17, further comprising: outputting uplink data to an NTN entity of the one or more NTN entities; monitoring a response to the uplink data for the duration the NTN entity is configured to store the UE data; and retransmitting the uplink data when the response is not received during the duration the NTN entity is configured to store the UE data.

Clause 19: The method of any combination of Clauses 17-18, further comprising selecting an NTN entity to initiate random access with based on the duration the NTN entity is configured to store the UE data.

Clause 20: The method of Clause 19, wherein the selecting the NTN entity to initiate random access with comprises selecting an NTN entity with a shorter data storage duration when the UE had uplink data with a delay target.

Clause 21: The method of any combination of Clauses 19-20, wherein selecting the NTN entity to initiate random access with comprises selecting an NTN entity with a longer data storage duration when the UE has delay sensitive uplink data.

Clause 22: The method of any combination of Clauses 2-21, wherein the one or more of: the amount of UE data the NTN entity is configured to store or the duration the NTN entity is configured to store the UE data is logical channel specific.

Clause 23: The method of Clause 22, further comprising obtaining an indication for each of a plurality of logical channels whether the one or more of: the amount of UE data the NTN entity is configured to store or the duration the NTN entity is configured to store the UE data applies to the logical channel.

Clause 24: The method of any combination of Clauses 22-23, further comprising selecting a logical channel of a plurality of logical channels for outputting uplink data to an NTN entity of the one or more NTN entities based on whether the logical channel satisfies the amount of UE data the NTN entity is configured to store or the duration the NTN entity is configured to store the UE data.

Clause 25: The method of any combination of Clauses 1-24, further comprising obtaining assistance information from a serving NTN entity indicating information of one or more neighboring NTN entities, wherein the information includes a frequency, a cell identifier (ID), an amount of UE data the NTN entity is configured to store, a duration the NTN entity is configured to store the UE data, a next feeder link availability time, a time of a next visit to store and forward service area, of the one or more neighboring NTN entities, or a combination thereof.

Clause 26: The method of Clause 25, further comprising reselecting one of the one or more neighboring NTN entities based on the information.

Clause 27: The method of any combination of Clauses 1-26, further comprising: outputting uplink data to one of the one or more NTN entities; and outputting an indication of whether the UE expects a response to the uplink data from the NTN entity or another NTN entity.

Clause 28: The method of Clause 27, further comprising obtaining an indication of a time to monitor the response to the uplink data.

Clause 29: The method of any combination of Clauses 1-28, further comprising obtaining an indication of an NTN entity to monitor a response to the uplink data.

Clause 30: The method of combination one of Clauses 1-29, further comprising: obtaining a first cell barring indication indicating the one or more NTN entities are barred; obtaining a second cell barring indication indicating whether one or more of the one or more NTN entities are barred; and following only the first cell barring indication when the UE does not support store and forward operation and following only the second cell barring indication when the UE supports store and forward operation.

Clause 31: The method of any combination of Clauses 1-30, wherein the one or more NTN entities comprises satellites.

Clause 32: A method for wireless communication by a network entity, comprising: outputting information to a user equipment (UE) of one or more non-terrestrial network (NTN) entities configured to store UE data, including the NTN entity, the information indicating one or more of: an amount of UE data the NTN entity is configured to store or a duration the NTN entity is configured to store the UE data.

Clause 33: The method of Clause 32, wherein the one or more of: the amount of UE data the NTN entity is configured to store or the duration the NTN entity is configured to store the UE data is associated with a quality-of-service (QOS) of the UE data or of a logical channel.

Clause 34: The method of any combination of Clauses 32-33, wherein the one or more of: the amount of UE data the NTN entity is configured to store or the duration the NTN entity is configured to store the UE data is associated with at least one of: a priority of the UE data or a priority of the UE.

Clause 35: The method of any combination of Clauses 32-34, wherein the one or more of: the amount of UE data the NTN entity is configured to store or the duration the NTN entity is configured to store the UE data is UE specific.

Clause 36: The method of any combination of Clauses 32-35, wherein the one or more of: the amount of UE data the NTN entity is configured to store or the duration the NTN entity is configured to store the UE data is NTN entity specific.

Clause 37: The method of any combination of Clauses 32-36, wherein the one or more of: the amount of UE data the NTN entity is configured to store or the duration the NTN entity is configured to store the UE data is cell specific.

Clause 38: The method of any combination of Clauses 32-37, wherein the one or more of: the amount of UE data the NTN entity is configured to store or the duration the NTN entity is configured to store the UE data comprises a first amount of downlink UE data the NTN entity is configured to store or the duration the NTN entity is configured to store the downlink UE data and a second amount of uplink UE data the NTN entity is configured to store or the duration the NTN entity is configured to store the uplink UE data.

Clause 39: The method of any combination of Clauses 32-38, wherein the outputting the information of the one or more NTN entities comprises outputting a broadcast system information block (SIB) indicating the one or more of: the amount of UE data the NTN entity is configured to store or the duration the NTN entity is configured to store the UE data.

Clause 40: The method of any combination of Clauses 32-39, wherein the outputting the information of the one or more NTN entities comprises outputting dedicated signaling indicating the one or more of: the amount of UE data the NTN entity is configured to store or the duration the NTN entity is configured to store the UE data.

Clause 41: The method of any combination of Clauses 32-40, wherein the outputting the information of the one or more NTN entities comprises outputting the amount of UE data the NTN entity is configured to store.

Clause 42: The method of any combination of Clauses 32-41, further comprising: obtaining a request for a larger amount of UE data at least one NTN entity of the one or more NTN entities is configured to store; and configuring the NTN entity to store the larger amount of UE data in response to the request.

Clause 43: The method of any combination of Clauses 32-42, wherein the outputting the information of the one or more NTN entities comprises outputting the duration the NTN entity is configured to store the UE data.

Clause 44: The method of any combination of Clauses 32-43, wherein the one or more of: the amount of UE data the NTN entity is configured to store or the duration the NTN entity is configured to store the UE data is logical channel specific.

Clause 45: The method of any combination of Clauses 32-44, further comprising outputting an indication for each of a plurality of logical channels whether the one or more of: the amount of UE data the NTN entity is configured to store or the duration the NTN entity is configured to store the UE data applies to the logical channel.

Clause 46: The method of any combination of Clauses 32-45, further comprising outputting assistance information from a serving NTN entity indicating information of one or more neighboring NTN entities, wherein the information includes a frequency, a cell identifier (ID), an amount of UE data the NTN entity is configured to store, a duration the NTN entity is configured to store the UE data, a next feeder link availability time, a time of a next visit to store and forward service area, of the one or more neighboring NTN entities, or a combination thereof.

Clause 47: The method of any combination of Clauses 32-46, further comprising: obtaining an indication of an NTN the UE expects a response to uplink data from.

Clause 48: The method of any combination of Clauses 32-47, further comprising outputting an indication of a time for the UE to monitor a response to uplink data.

Clause 49: The method of any combination of Clauses 32-48, further comprising outputting an indication of an NTN entity for the UE to monitor a response to uplink data.

Clause 50: The method of any combination of Clauses 32-49, further comprising: outputting a first cell barring indication indicating the one or more NTN entities are barred for UEs that do not support store and forward operation; and outputting a second cell barring indication indicating whether one or more of the one or more NTN entities are barred for UEs that support store and forward operation.

Clause 51: The method of any combination of Clauses 32-50, wherein the one or more NTN entities comprises satellites.

Clause 52: The method of any combination of Clauses 32-51, further comprising: receiving uplink data from the UE intended another UE; and providing the uplink data to a ground station associated with the other UE.

Clause 53: The method of any combination of Clauses 32-52, wherein the network entity is a satellite.

Clause 54: An apparatus, comprising: a memory comprising executable instructions; and a processor configured to execute the executable instructions and cause the apparatus to perform a method in accordance with any combination of Clauses 1-53.

Clause 55: An apparatus, comprising means for performing a method in accordance with any combination of Clauses 1-53.

Clause 56: A non-transitory computer-readable medium comprising executable instructions that, when executed by a processor of an apparatus, cause the apparatus to perform a method in accordance with any combination of Clauses 1-53.

Clause 57: A computer program product embodied on a computer-readable storage medium comprising code for performing a method in accordance with any combination of Clauses 1-53.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions. A UE may include one or more memories storing processor executable code, and one or more processors coupled with the one or more memories. A network entity may include one or more memories storing processor executable code, and one or more processors coupled with the one or more memories.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) configured for wireless communications, the UE comprising:

a memory comprising computer-executable instructions; and at least one processor configured to execute the computer-executable instructions and cause the UE to:

obtain information of one or more non-terrestrial network (NTN) entities configured to store UE data;

select one of the one or more NTN entities based on the information;

obtain a first cell barring indication indicating the one or more NTN entities are barred;

obtain a second cell barring indication indicating whether one or more of the one or more NTN entities are barred;

follow only the first cell barring indication when the UE does not support store and forward operation and following only the second cell barring indication when the UE supports store and forward operation; and output uplink data to the NTN entity.

2. The UE of claim 1, wherein the information for each of the one or more NTN entities comprises at least one of: an amount of UE data the NTN entity is configured to store or a duration the NTN entity is configured to store the UE data.

3. The UE of claim 2, wherein the at least one of: the amount of UE data the NTN entity is configured to store or the duration the NTN entity is configured to store the UE data is associated with a quality-of-service (QOS) of the UE data or of a logical channel.

4. The UE of claim 2, wherein the at least one of: the amount of UE data the NTN entity is configured to store or the duration the NTN entity is configured to store the UE data is associated with at least one of: a priority of the UE data or a priority of the UE.

5. The UE of claim 2, wherein the at least one of: the amount of UE data the NTN entity is configured to store or the duration the NTN entity is configured to store the UE data is UE specific.

6. The UE of claim 2, wherein the at least one of: the amount of UE data the NTN entity is configured to store or the duration the NTN entity is configured to store the UE data is NTN entity specific.

7. The UE of claim 2, wherein the at least one of: the amount of UE data the NTN entity is configured to store or the duration the NTN entity is configured to store the UE data is cell specific.

8. The UE of claim 2, wherein the at least one of: the amount of UE data the NTN entity is configured to store or the duration the NTN entity is configured to store the UE data comprises a first amount of downlink UE data the NTN entity is configured to store or the duration the NTN entity is configured to store the downlink UE data and a second amount of uplink UE data the NTN entity is configured to store or the duration the NTN entity is configured to store the uplink UE data.

9. The UE of claim 2, wherein the at least one processor being configured to cause the UE to obtain the information of the one or more NTN entities comprises the at least one processor being configured to cause the UE to obtain a broadcast system information block (SIB) indicating the one or more of: the amount of UE data the NTN entity is configured to store or the duration the NTN entity is configured to store the UE data.

10. The UE of claim 2, wherein the at least one processor being configured to cause the UE to obtain the information of the one or more NTN entities comprises the at least one processor being configured to cause the UE to obtain dedicated signaling indicating the one or more of: the amount of UE data the NTN entity is configured to store or the duration the NTN entity is configured to store the UE data.

11. The UE of claim 2, wherein the at least one processor being configured to cause the UE to obtain the information of the one or more NTN entities comprises the at least one processor being configured to cause the UE to obtain the amount of UE data the NTN entity is configured to store.

12. The UE of claim 11, wherein the at least one processor is further configured to cause the UE to, before initiating random access with an NTN entity of the one or more NTN entities, determine whether an amount of uplink data at the UE is larger than the amount of UE data the NTN entity is configured to store.

13. The UE of claim 12, wherein the at least one processor is further configured to cause the UE to select a different NTN entity when the amount of uplink data at the UE is larger than the amount of UE data the NTN entity is configured to store.

14. The UE of claim 12, wherein the at least one processor is further configured to cause the UE to request a larger amount of uplink data the NTN entity when the amount of uplink data at the UE is larger than the amount of UE data the NTN entity is configured to store.

15. The UE of claim 12, wherein the at least one processor is further configured to cause the UE to restrict an amount of the uplink data sent to the NTN entity when the amount of uplink data at the UE is larger than the amount of UE data the NTN entity is configured to store.

16. The UE of claim 12, wherein the at least one processor is further configured to cause the UE to initiate random access with the NTN entity when the amount of uplink data at the UE is equal to or smaller than the amount of UE data the NTN entity is configured to store.

17. The UE of claim 2, wherein the at least one processor being configured to cause the UE to obtain the information of the one or more NTN entities comprises wherein the at least one processor being configured to cause the UE to obtain the duration the NTN entity is configured to store the UE data.

18. The UE of claim 17, wherein the at least one processor is further configured to cause the UE to select an NTN entity to initiate random access with based on the duration the NTN entity is configured to store the UE data.

19. The UE of claim 18, wherein the at least one processor being configured to cause the UE to select the NTN entity to initiate random access with comprises the at least one processor being configured to cause the UE to select an NTN entity with a shorter data storage duration when the UE has uplink data with a delay target.

20. The UE of claim 18, wherein the at least one processor being configured to cause the UE to select the NTN entity to initiate random access with comprises the at least one processor being configured to cause the UE to select an NTN entity with a longer data storage duration when the UE has delay sensitive uplink data.

21. The UE of claim 2, wherein the at least one of: the amount of UE data the NTN entity is configured to store or the duration the NTN entity is configured to store the UE data is logical channel specific.

22. The UE of claim 21, wherein the at least one processor is further configured to cause the UE to obtain an indication for each of a plurality of logical channels whether the one or more of: the amount of UE data the NTN entity is configured to store for the logical channel or whether the duration the NTN entity is configured to store the UE data applies to the logical channel.

23. The UE of claim 21, wherein the at least one processor is further configured to cause the UE to select a logical channel of a plurality of logical channels for outputting uplink data to an NTN entity of the one or more NTN entities based on whether the logical channel satisfies the amount of UE data the NTN entity is configured to store or the duration the NTN entity is configured to store the UE data.

24. The UE of claim 1, wherein the at least one processor is further configured to cause the UE to obtain assistance information from a serving NTN entity indicating information of one or more neighboring NTN entities, wherein the information includes a frequency, a cell identifier (ID), an amount of UE data the NTN entity is configured to store, a duration the NTN entity is configured to store the UE data, a next feeder link availability time, a time of a next visit to store and forward service area, of the one or more neighboring NTN entities, or a combination thereof.

25. The UE of claim 1, wherein the at least one processor is further configured to cause the UE to:

output uplink data to one of the one or more NTN entities; and output an indication of whether the UE expects a response to the uplink data from the NTN entity or another NTN entity.

26. The UE of claim 25, wherein the at least one processor is further configured to cause the UE to obtain an indication of at least one of: a time to monitor the response to the uplink data or an NTN entity to monitor a response to the uplink data.

27. A method for wireless communication by a user equipment (UE), the method comprising:

obtaining information of one or more non-terrestrial network (NTN) entities configured to store UE data;

selecting one of the one or more NTN entities based on the information;

obtaining a first cell barring indication indicating the one or more NTN entities are barred;

34 obtaining a second cell barring indication indicating whether one or more of the one or more NTN entities are barred;

following only the first cell barring indication when the UE does not support store and forward operation and following only the second cell barring indication when the UE supports store and forward operation; and outputting uplink data to the NTN entity.

28. A network entity configured for wireless communications, the network entity comprising:

a memory comprising computer-executable instructions; and at least one processor configured to execute the computer-executable instructions and cause the network entity to:

output information to a user equipment (UE) of one or more non-terrestrial network (NTN) entities configured to store UE data, including the NTN entity;

output to the UE a first cell barring indication indicating the one or more NTN entities are barred when the UE does not support store and forward operation; and output to the UE a second cell barring indication indicating whether one or more of the one or more NTN entities are barred when the UE supports store and forward operation.

29. A method for wireless communication by a network entity, the method comprising:

outputting information to a user equipment (UE) of one or more non-terrestrial network (NTN) entities configured to store UE data, including the NTN entity;

outputting to the UE a first cell barring indication indicating the one or more NTN entities are barred when the UE does not support store and forward operation; and outputting to the UE a second cell barring indication indicating whether one or more of the one or more NTN entities are barred when the UE supports store and forward operation.

* * * * *